United States Patent [19]

Capuano et al.

[11] Patent Number: 5,126,216

[45] Date of Patent: Jun. 30, 1992

[54] TERNARY ALLOY ELECTROCATALYSTS

[75] Inventors: Guido A. Capuano, Boucherville; Abdeltif Essalik, St-Romuald, both of Canada

[73] Assignee: Universite Du Quebec A Montreal, Montreal, Canada

[21] Appl. No.: 618,695

[22] Filed: Nov. 27, 1990

[51] Int. Cl.$^5$ .............................................. H01M 4/92
[52] U.S. Cl. ........................................ 429/42; 429/40; 429/44; 502/101
[58] Field of Search .................... 502/101; 429/40, 42, 429/44

[56] References Cited

U.S. PATENT DOCUMENTS

| | | | |
|---|---|---|---|
| 3,429,751 | 2/1969 | Heuse | 204/129.43 |
| 3,458,358 | 7/1969 | Thompson, Jr. | 502/101 |
| 3,617,389 | 11/1971 | Kuhn et al. | 502/101 |
| 3,765,947 | 10/1973 | Felten et al. | 502/101 |
| 4,186,110 | 1/1980 | Jalan et al. | 429/44 |
| 4,192,907 | 3/1980 | Jalan et al. | 429/44 |
| 4,316,944 | 2/1982 | Landsman et al. | 429/44 |
| 4,446,245 | 5/1984 | Hinden | 502/101 |
| 4,447,506 | 5/1984 | Luczak et al. | 429/44 |
| 4,569,924 | 2/1986 | Ozin et al. | 502/101 |
| 4,806,515 | 2/1989 | Luczak et al. | 4529/40 |
| 4,810,594 | 3/1989 | Bregoli et al. | 429/42 |

FOREIGN PATENT DOCUMENTS 0165024 6/1985 European Pat. Off. ............ 429/44

OTHER PUBLICATIONS

Julius Grant, "Hackhn Chemical Dictionary", p. 28 (1969).
Resume of work performed under contract No. DE-AC21-82M C24261 for the U.S. Department of Energy (Giner Inc.).

Primary Examiner—Anthony McFarlane
Attorney, Agent, or Firm—Reed Smith Shaw & McClay

[57] ABSTRACT

The present invention is concerned with a ternary alloy electrocatalyst for oxygen reduction in fuel cell electrodes or other catalytic structure. The electrocatalyst of the present invention is made of a noble metal chromium-copper alloy supported on an electrically conductive material, and has a mass activity for oxygen reduction at least four times higher than that of unalloyed noble metal.

10 Claims, No Drawings

TERNARY ALLOY ELECTROCATALYSTS

TECHNICAL FIELD

The present invention relates to the production of noble metal ternary alloy electrocatalysts for use in fuel cell cathode and other catalytic systems.

PRIOR ART

A fuel cell is an electrochemical device in which the energy produced by a chemical reaction is converted to direct current electricity. To obtain a high efficiency of conversion, it is necessary that the reaction of the fuel and oxidant occurs in such a manner that the amount of energy lost into heat is as small as possible.

A typical fuel cell comprises a fuel electrode or anode supplied with fuel, generally hydrogen, and a cathode to which an oxidant, usually oxygen or air, is fed. An electrolyte, such as phosphoric acid or sulfuric acid separates the electrodes. In operation, the fuel is oxidized at the surface of the anode to liberate electrons, simultaneously oxygen or air is reduced at the surface of the cathode with the consumption of electrons. The electrons conducted from the anode to the cathode through wires external to the cell, produce the electrical current necessary to perform work.

Fuel cells differ from electroplates and accumulator in the way that the fuel and oxidant are not incorporated in the electrode, but rather continuously fed in. That is why such fuel cell can run endlessly.

However, fuel cells must fulfill certain requirements. They must be able to provide high reaction speed at the electrode for long periods of time. Also, the electrolyte must have a high ionic conductibility without corroding the electrodes and the other parts of the cell.

The efficiency at which the cell operates is determined by the activity of the cathode catalyst. This activity is measured by the rate at which the electrochemical reduction of the oxidant proceeds on the surface of the catalyst in the presence of an electrolyte at a specific temperature and electrochemical potential.

Initially, electrocatalysts were made of platinum or other noble metals, as these metals were best able to withstand the corrosive environment of the electrochemical cell. Later, these noble metals were dispersed over the surface of electrically conductive supports such as carbon black, to increase the surface area of the catalyst, which in turn increased the number of reactive sites leading to improved efficiency of the cell. It was then discovered that certain alloys of noble metals exhibited increased catalytic activity, therefore, increasing fuel cells efficiency.

These alloys also have the advantage of significantly reducing the cost of the electrode, since the noble metal was not anymore the sole constituent, and generally, the other metal in the alloy is much cheaper.

The first attempts were directed to binary alloy electrocatalyst, for example, platinum-chromium in U.S. Pat. No. 4,316,944, or platinum-vanadium in U.S. Pat. No. 4,202,934.

Later, scientists found out that ternary alloy electrocatalysts were giving better results, i.e. such catalysts are more stable and have an increased activity for the electrochemical reduction of oxygen. As an example of such ternary alloy catalyst, there may be mentioned a platinum-chrome-cobalt alloy disclosed in GB 2,133,420 or a platinum-iron-copper alloy disclosed in EP 0 355 853.

EP 0 165 024 also discloses ternary alloy catalysts which comprise platinum as the noble metal, and at least two elements selected from chromium, cobalt, nickel, cerium, carbon, phosphorous, arsenic and boron. These catalysts, it is stated, provide a performance improvement of at least about 25 mV at 200 Ma/cm$^2$ as compared to standard platinum/Vulcan XC-72 electrocatalyst.

Even though there are many electrocatalysts already available, there is still a great need for electrocatalysts having improved properties, especially an enhanced mass activity, corrosion resistance, and reasonable cost price.

SUMMARY OF THE INVENTION

In accordance with the present invention, there is now provided a ternary alloy electrocatalyst for oxygen reduction in fuel cell electrodes or other catalytic structure. The electrocatalyst of the present invention is made of a noble metal chromium-copper alloy supported on an electrically conductive material, and has a mass activity for oxygen reduction at least four times higher than that of unalloyed noble metal.

More specifically, the electrocatalyst of the present invention contains from about 50 to 60% w/w of noble metal; from about 15 to 25% w/w of chromium, and from about 20 to 30% w/w of copper.

In one aspect of the present invention, the preferred noble metal is platinum or palladium.

In another aspect of the present invention, there is provided a cathode electrode for use in the reduction of oxygen in a fuel cell, said electrode containing a ternary alloy electrocatalyst of noble metal-chromium-copper.

DETAILED DESCRIPTION OF THE INVENTION

The present invention is directed to a noble metal ternary alloy electrocatalyst, which has a mass activity for oxygen reduction at least four times higher than that of the unalloyed noble metal. This catalyst comprises a ternary alloy of noble metal-chromium-copper, supported on an electrically conductive material, such as Vulcan XC-72 R carbon (Cabot Corporation).

Mass activity is an arbitrary defined measure of the effectiveness of a catalyst per unit weight of catalytic material. In the case of fuel cells with phosphoric or sulfuric acid as the electrolyte, we define the mass activity of the cathode catalyst in milliampere per milligram (mA/mg) of noble metal, the noble metal being usually platinum or palladium, as the maximum current available due to oxygen reduction at 0.9000 Volts, the potential being measured relative to an unpolarized reference electrode, that is H$_2$/Pt if the noble metal is platinum, or H$_2$/Pd if the noble metal is palladium, in the same experimental conditions.

The foregoing and other features and advantages of the present invention will become apparent in light of the following description.

The ternary alloy electrocatalysts of the present invention may find applications not only as catalysts in fuel cell electrodes but also as catalysts in the chemical, pharmaceutical, automotives and anti-pollution fields. Such catalysts are particularly useful as electrocatalysts for the reduction of oxygen. Their activity makes them suitable for use in acid fuel cell or electrochemical cell.

However, their use is not limited to a fuel cell and they can be used in any environment where electrochemical oxygen reduction takes place as part of the process, e.g. in a metal-air battery.

The basic process for producing the noble metal-chromium-copper electrocatalyst of the present invention, comprises adsorbing the chromium containing specie, preferably in the anion form, on the supported noble metal catalyst, at a controlled pH, followed by adsorption of the copper containing specie, preferably in the cation form, on the supported noble metal-chromium catalyst, followed by heating the copper and chromium impregnated catalysts in a reducing atmosphere. The preferred platinum salt for the purpose of the present invention is dinitrodiaminoplatin (II), the preferred chromium salt is ammonium chromate, and the preferred copper salt is copper nitrate. The preferred ternary alloys of the present invention have surface area greater than 30 $m^2/g$ of noble metal. Platinum is the preferred noble metal, but palladium can also be used.

Sulfuric acid is a suitable electrolyte for fuel cells similar to the one concerned by the present invention, since the heating does not have to be raised as high as when phosphoric acid is used, and sulfuric acid is a much stronger acid, therefore, providing hydrogen ions more easily in solution. However, sulfuric acid is very corrosive, and that is why phosphoric acid is more likely to be used.

Preferably, better results are obtained with up to 30 wt % Cu and 20 wt % Cr in the alloy, and more preferably 26 wt % Cu and 17% Cr.

As illustrated in Table 1, four different alloys of Pt-Cr-Cu were prepared, and the results obtained from them will be further discussed in the Examples.

The following examples are provided to illustrate several aspects of the present invention rather than limit its scope.

EXAMPLE 1

Preparation of the Electrically Conductive Carbon Support 30 g of graphitic carbon Vulcan XC-72 R are dispersed by ultrasonic blending in 100 ml of a solution containing 0.3 g of copper acetate for 15 minutes. The mixture is then stirred and heated until water is evaporated, and heated at 150° C. for 2 hours.

The residue is further stirred in order to minimize its density. 2 g of this residue is placed into a combustion boat in a quartz tube and heated at 570° C. under nitrogen atmosphere for 15 minutes and then, still at 570° C., in an oxygen atmosphere for a period varying between 30 to 90 seconds. The resulting material is then cooled to room temperature under a nitrogen atmosphere and weighed. This heating operation is repeated until a weight loss of 20±5% is obtained. The material is then washed with 50% vol $HNO_3$ and with distilled water. It is finally heated at 100° C. for 24 hours and passed through a 100 mesh screen, giving the electrically conductive carbon support desired.

EXAMPLE 2

Preparation of the Carbon Supported Platinum Catalyst 10 g of the electrically conductive carbon support prepared in Example 1 are added to a suspension of 1.7 g of dinitrodiaminoplatin (II) in 50 ml of 50% vol $HNO_3$. After vigorous stirring, the mixture is heated at 185° C. for 12 hours. The black residue is passed through a 100 mesh screen, leading to the carbon supported platinum.

EXAMPLE 3

Preparation of Platinum-Chromium Catalyst

The Pt-Cr alloy was prepared according to Example 4 by omitting the addition of copper salt.

EXAMPLE 4

Preparation of Platinum-Chromium-Copper Catalyst

The alloys are prepared by adsorbing the salt of the desired alloying element onto the carbon supported platinum prepared in Example 2, followed by a thermal treatment at 900° C. under an inert atmosphere.

1.5 g of carbon supported platinum catalyst, prepared in Example 2 and containing 10% platinum by weight are dispersed in 80 ml of distilled water and ultrasonically stirred for 15 minutes. The pH of the solution is raised to 8 by addition of 10% vol. ammonium hydroxide, and stirring is continued during the entire preparation period. A solution of 0.30 g of ammonium chromate in 15 ml of distilled water is added to the mixtrue and the pH is then adjusted to 5.5 with 10% vol. $HNO_3$ to facilitate the adsorption of chromium. After 15 minutes stirring, a solution of 0.17 g of copper nitrate in 15 ml of distilled water is added to the mixture and stirring is continued for an additional 30 minutes, ensuring the pH is maintained at 5.5. The suspension is then filtered through a very dense filter paper, the residue dried at 90° C. for 12 hours, cooled and passed through a 100 mesh screen. Heating for 1 hour at 900° C. under a nitrogen atmosphere provides the Pt-Cr-Cu electrocatalyst, designated as Pt-Cr-Cu #1.

In order to optimize the ternary Pt-Cr-Cu alloy with respect to the concentration of copper, 3 additional ternary alloys were prepared using the same method.

Varying amounts of copper nitrate were added, namely, 0.48; 0.96 and 1.29 g, in 15 ml of distilled water (Table 1, samples #2 to #4 respectively), while the quantities of the other constituents of the alloys remained unchanged.

Chemical analysis of the resulting material can be made by passing a water suspension of the alloy in an atomic absorption spectrophotometer, after calibrating the latter with known concentration of each element, in a carbon matrix.

Table 1 shows chemical composition of the electrocatalyst within the scope of the present invention. Other ternary alloy catalysts were prepared, in accordance with the precess of Example 3 as illustrated in Table 1, where the copper salt is replaced by a vanadium salt, a zirconium salt or a manganese salt. It will be clear from the upcoming results obtained, that these electrocatalysts do not show mass activity for the reduction of $O_2$ as high as the Pt-Cr-Cu ternary alloy electrocatalyst of the present invention, especially Pt-Cr-Cu #4. In fact, unalloyed platinum provided better results than these three ternary alloys.

TABLE 1

| | Chemical Composition of ternary alloy electrocatalysts | | | | |
|---|---|---|---|---|---|
| | Composition (% w/w) | | | | |
| Alloy | Pt | Cr | Cu | Mn | Zr | V |
| Pt—Cr | 74.70 | 25.30 | | | | |
| Pt—Cr—Cu #1 | 56.87 | 19.01 | 24.12 | | | |

TABLE 1-continued

Chemical Composition of ternary alloy electrocatalysts

| Alloy | Composition (% w/w) | | | | | |
|---|---|---|---|---|---|---|
| | Pt | Cr | Cu | Mn | Zr | V |
| Pt—Cr—Cu #2 | 53.27 | 22.56 | 24.20 | | | |
| Pt—Cr—Cu #3 | 57.26 | 16.21 | 26.53 | | | |
| Pt—Cr—Cu #4 | 57.05 | 17.05 | 25.90 | | | |
| Pt—Cr—Zr | 52.67 | 16.94 | | | 30.39 | |
| Pt—Cr—V | 57.94 | 20.40 | | | | 21.66 |
| Pt—Cr—Mn | 51.36 | 20.05 | | 28.59 | | |

The above ternary electrocatalysts of Pt-Cr-Cu were tested to demonstrate their superiority over the supported unalloyed catalyst as well as their respective binary counter parts, and other ternary electrocatalysts. Cathodes were made from each of the alloys prepared as described above, and tested in 1 cm² laboratory fuel cells. The cells were run and the voltage measured at a current density of 0.20 A/cm². All the electrodes contained the same platinum loading i.e. 0.5 mg of Pt per cm². Each of the catalysts performance was evaluated at standard conditions i.e. a cell current density of 0.20 A/cm², 190° C. cell temperature with a high flow rate of $O_2$ as the reacting gas, and with voltage at the given current corrected to eliminate cell resistance (iR-free). Results are shown in Table 2.

The data in Table 2 illustrate an increase in the catalytic activity for the electrochemical reduction of oxygen of at least four times higher for the platinum-chromium-copper electrocatalyst of the present invention than that of the supported unalloyed platinum. The table also shows that the best catalyst have the same interplanar distance "d" and that the initial amount of copper salt used for their preparation does not affect the copper content of the ternary alloy prepared.

However, it is well known that mass activity of noble metals dispersed in carbon varies with cristallite size. Since optimisation of cristallite size has not yet been made for the Pt-Cr-Cu alloy catalyst disclosed in the present application, improved values of mass activity are expected when such work will be accomplished.

TABLE 2

COMPARISON OF TERNARY Pt—Cr—Cu ALLOYS TO UNALLOYED PLATINUM, BINARY Pt—Cr ALLOY OR OTHER TERNARY ALLOYS, IN $H_3PO_4$ 99% AT 180° C. WITH $O_2$ AS THE OXIDANT

| Catalyst | $O_2$ activity at 900 mV (mA/mg of Pt) | $H_2/O_2$ IR free cell voltage at 190° C. and 200 mA/cm² (mV vs ERH) |
|---|---|---|
| Pt in graphite | 5 | 680 |
| Pt—Cr | 12 | 748 |
| Pt—Cr—Cu #1 | 22 | 774 |
| Pt—Cr—Cu #2 | 22 | 756 |
| Pt—Cr—Cu #3 | 24 | 757 |
| Pt—Cr—Cu #4 | 49 | 856 |
| Pt—Cr—Zr | 1.5 | 530 |
| Pt—Cr—V | 1.0 | 520 |
| Pt—Cr—Mn | 1.8 | 671 |

It will be noted that the electrocatalyst Pt-Cr-Cu #4 has an $O_2$ activity almost 10 times higher than that of unalloyed platinum (49 vs 5).

Similar results have been obtained by proceeding in the same manner, but replacing $O_2$ by air as the oxidant.

The electrocatalysts were also tested in 20% w/w sulfuric acid at 70° C. with $O_2$ as the oxidant. As mentioned previously, sulfuric acid provides increased potential values, even at lower temperatures. Electrocatalyst Pt-Cr-Cu #4 shows again the best results.

TABLE 3

COMPARISON OF TERNARY Pt—Cr—Cu ALLOYS TO UNALLOYED Pt, BINARY Pt—Cr AND OTHER TERNARY ALLOYS, IN $H_2SO_4$ 20% W/W AT 70° C. WITH $O_2$ AS THE OXIDANT

| Catalyst | $O_2$ activity at 900 mV (mA/mg of Pt) | $H_2/O_2$ IR free cell voltage at 190° C. and 200 mA/cm² (mV vs ERH) |
|---|---|---|
| Pt in graphite | 15 | 720 |
| Pt—Cr | 20.5 | 805 |
| Pt—Cr—Cu #1 | 27 | 800 |
| Pt—Cr—Cu #2 | 46 | 787 |
| Pt—Cr—Cu #3 | 51 | 818 |
| Pt—Cr—Cu #4 | 62 | 867 |
| Pt—Cr—Zr | 2 | 671 |
| Pt—Cr—V | 2 | 630 |
| Pt—Cr—Mn | 3 | 718 |

As it can be seen, the electrocatalyst Pt-Cr-Cu #4 of the present invention has an $O_2$ activity more than 4 times higher than that of unalloyed platinum (62 vs 15).

EXAMPLE 5

Preparation of an Electrode 50 mg of electrocatalyst is added to 36 mg of a suspension of a tetrafluoroethylene polymer such as Teflon-30 (60% w/w Teflon). Three drops of distilled water are added, and the mixture is heated and stirred until a firm paste is obtained. The paste is then placed on a gold-plated screen of 1 cm², and dried until small cracks appear on the paste. It is then squeezed at a temperature of about 300° C. for 5 minutes between two metal plates covered with a thin layer of aluminum, at a pressure of 3 metric tons.

What is claimed is:

1. An electrocatalyst for the reduction of oxygen, comprising a ternary alloy of chromium, copper and a noble metal, supported on an electrically conductive substrate.

2. An electrocatalyst according to claim 1, wherein the concentration of noble metal is from about 50% to about 60% w/w; the concentration of chromium is from about 15% to about 25% w/w; and the concentration of copper is from about 20% to about 30% w/w.

3. An electrocatalyst according to claim 2, wherein the concentration of noble metal is about 57% w/w; the concentration of chromium is about 17% w/w and the concentration of copper is about 26% w/w.

4. An electrocatalyst according to claim 1, wherein the noble metal is selected from platinum and palladium.

5. An electrocatalyst according to claim 4, wherein the noble metal is platinum.

6. An electrocatalyst according to claim 1, wherein the electrically conductive substrate is carbon-black.

7. A cathode electrode for the reduction of oxygen, comprising an electrocatalyst and a tetrafluoroethylene polymer, said electrocatalyst comprising a ternary alloy of chromium, copper and a noble metal, supported on an electrically conductive substrate.

8. An electrochemical cell comprising a cathode electrode, said cathode electrode including an electrocatalyst and a tetrafluoroethylene polymer, said electrocatalyst comprising a ternary alloy of chromium, copper and a noble metal, supported on an electrically conductive substrate.

9. An acid fuel cell comprising an electrolyte selected from the group consisting of sulfuric acid and phosphoric acid, and a cathode electrode, said cathode electrode including an electrocatalyst, said electrocatalyst comprising a ternary alloy of chromium, copper and a noble metal supported on an electrically conductive substrate, said electrically conductive substrate comprising carbon-black.

10. A fuel cell comprising an anode electrode and a cathode electrode, said cathode electrode including an electrocatalyst, said electrocatalyst comprising a ternary alloy of chromium, copper and a noble metal supported on an electrically conductive substrate, said electrically conductive substrate comprising carbon-black, said fuel cell further comprising an electrolyte disposed between said anode electrode and said cathode electrode, said electrolyte being selected from the group consisting of phosphoric acid and sulfuric acid.

* * * * *